Patented Jan. 7, 1930

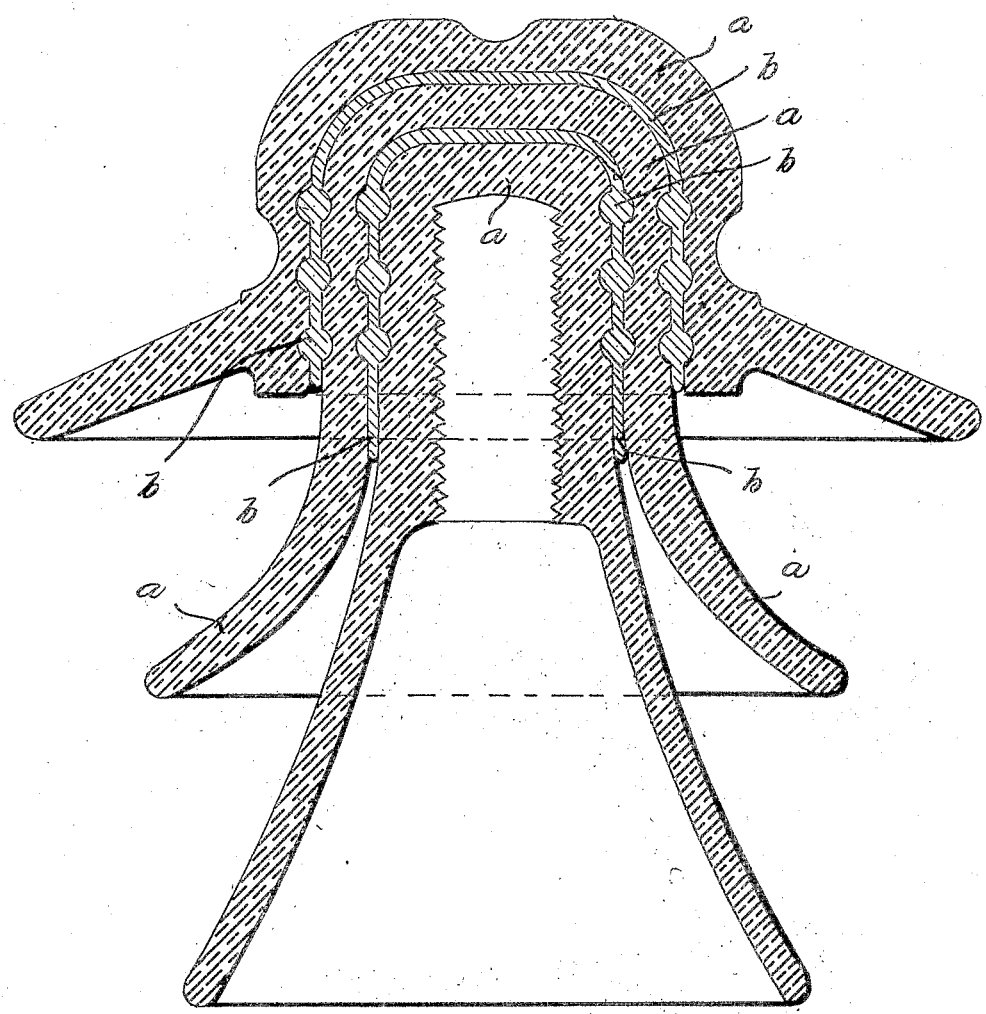

1,742,625

UNITED STATES PATENT OFFICE

FERDINAND WECKERLE, OF MUNICH, GERMANY, ASSIGNOR TO STUDIENGESELL-SCHAFT FUER WIRTSCHAFT U. INDUSTRIE, M. B. H., OF MUNICH, GERMANY

PROCESS OF UNITING BY SEALING THE INSULATING PARTS OF HIGH-TENSION INSULATORS

Application filed July 8, 1926, Serial No. 121,084, and in Germany October 25, 1925.

This invention relates to improvements in processes for uniting parts of insulation material especially used in the manufacture of electrical insulators.

Large insulators are usually made in several pieces because it is generally impossible to manufacture such insulators in one piece for the reason that in drying such large porcelain masses, cracks would be formed which would render the whole insulator useless. It has been known to seal such insulator parts together by means of a common cement and also to secure such parts together by employing impregnated hemp. It has also been the practice to glaze the parts together in a manner similar to that employed for attaching metallic parts; also such insulators are sometimes made by filling-up the intermediate layers with lead or easily fusible alloys. Still another manner of joining the parts of insulators consists in using copper rings which are electrically heated nearly up to the melting point and then compressed by upsetting.

The disadvantage of sealing the parts with cement resides in the expanding of the same, which causes much breakage. Also, hemp will soon be chafed through and metals are generally good conductors of heat and electricity. The glazed joints of porcelain parts are likewise not free from objection on account of the difference of expansion of the glazing or the glass and the porcelain, which is a sintered product. This has been proved by numerous examples.

According to the present invention a process is employed which substitutes all the above mentioned processes and excludes all the named disadvantages. In this process rubber is used, which is highly elastic and has a very good insulating power superior to that of the porcelain. The precaution however must be taken to choose such mixtures which have only enough of sulphur as will be required for vulcanization. In order to increase the rapidity of the vulcanization as well as also the rapidity of the reaction of the sulphur in the rubber, organic or inorganic accelerating substances of vulcanization are preferably added to the rubber. In this manner a very good durability of the rubber will be obtained and any crystallization of the sulphur will be avoided.

In the annexed drawing an insulator is represented as an example where the porcelain parts "a" are joined together. The space "b" which is preferably provided with fluting of any kind as retaining means, is filled with rubber or also with rubber and some intermediate layers of another nature. The iron parts may also be embedded into the rubber but it is advisable to give first to such iron parts a coating of hard rubber or ebonite because the ebonite unites the best with the iron. After the filling-in of the rubber the whole is subjected to a vulcanizing process. The intermediate layers may consist of twine or other bodies of a similar nature which will diminish the liability of the rubber of becoming torn.

However it is also possible to unite cement with the rubber in such a manner that the rubber is added, in a pulverized state or in fine pellicles, to the cement and that after the setting of the cement the whole insulator is subjected to a vulcanizing process. While pulverizing the unvulcanized rubber, it is subjected to the action of liquid air with the result that, in its cold state, the rubber loses its elasticity and can be easily pulverized and mixed with the cement. Water may be added to the mixture to facilitate the mixing process. By such a proceeding a far greater solidity will be obtained because elastic intermediate joints have been created which will counteract successfully all the expanding tendency of the cement.

Instead of employing the rubber in the way described, one or several parts of the insulator may also receive a very thin coating of rubber and the space then be filled up with cement. The important feature of such a process is that the rubber will counteract the expanding tendency of the cement and that it secures a more or less complete water-tight joint. The possibility of employing the rubber for insulators is very extended. The insulators may also be formed of other substances than porcelain, such as glass, for instance.

What is claimed is:—

The process of sealing together two like parts of material, which consists in adding cement to unvulcanized rubber in a finely divided state, inserting the mixture between said parts, and vulcanizing the mixture after the setting of the cement.

In testimony whereof I have affixed my signature.

FERDINAND WECKERLE.